(12) United States Patent
Cho et al.

(10) Patent No.: US 9,383,589 B2
(45) Date of Patent: Jul. 5, 2016

(54) DISPLAY DEVICE

(71) Applicant: SAMSUNG DISPLAY CO., LTD., Yongin, Gyeonggi-Do (KR)

(72) Inventors: Jung-Hyun Cho, Seoul (KR); Moon Jung Baek, Seoul (KR); Hae Young Yun, Suwon-Si (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 0 days.

(21) Appl. No.: 14/477,554

(22) Filed: Sep. 4, 2014

(65) Prior Publication Data

US 2015/0219911 A1     Aug. 6, 2015

(30) Foreign Application Priority Data

Feb. 4, 2014  (KR) .................. 10-2014-0012624

(51) Int. Cl.
| | |
|---|---|
| *G02F 1/1335* | (2006.01) |
| *G02B 27/22* | (2006.01) |
| *G02F 1/1343* | (2006.01) |
| *G02F 1/139* | (2006.01) |
| *H04N 13/04* | (2006.01) |
| *G02F 1/29* | (2006.01) |

(52) U.S. Cl.
CPC .......... *G02B 27/2214* (2013.01); *G02F 1/1393* (2013.01); *G02F 1/134309* (2013.01); *H04N 13/0404* (2013.01); *H04N 13/0452* (2013.01); *G02F 1/133536* (2013.01); *G02F 2001/134381* (2013.01); *G02F 2001/294* (2013.01)

(58) Field of Classification Search
CPC .............. G02F 1/133536; G02F 2001/133545; G02B 27/2214; H04N 13/0402
USPC ................................ 349/15, 57, 95, 113, 200
See application file for complete search history.

(56) References Cited

U.S. PATENT DOCUMENTS

| | | | |
|---|---|---|---|
| 7,057,681 | B2 | 6/2006 | Hinata et al. |
| 7,495,719 | B2 | 2/2009 | Adachi et al. |
| 7,903,335 | B2 | 3/2011 | Nieuwkerk et al. |
| 8,054,417 | B2 | 11/2011 | Kim et al. |
| 8,208,007 | B2 | 6/2012 | White |

(Continued)

FOREIGN PATENT DOCUMENTS

| | | |
|---|---|---|
| JP | 2004-069926 | 3/2004 |
| JP | 2006-053277 | 2/2006 |
| JP | 2006-308897 | 11/2006 |
| JP | 2007-017575 | 1/2007 |
| JP | 4349963 | 7/2009 |
| JP | 2012-113142 | 6/2012 |

(Continued)

*Primary Examiner* — Vip Patel
(74) *Attorney, Agent, or Firm* — F. Chau & Associates, LLC

(57) ABSTRACT

A display device according to an exemplary embodiment of the present disclosure includes: a liquid crystal lens panel positioned on a display panel; and a reflective polarizer positioned between the display panel and the liquid crystal lens panel, wherein the liquid crystal lens panel includes a lower substrate and an upper substrate facing each other, a lower lens electrode formed on the lower substrate, where the lower lens electrode includes a plurality of separate lower lens electrodes formed into lower lens electrode groups, where a width of each separate lower lens electrode becomes wider closer to a center of the lower lens electrode group; an upper lens electrode formed on the upper substrate, and a liquid crystal layer interposed between the lower substrate and the upper substrate. The liquid crystal lens panel is configured to be operated in a 2D mode, a 3D mode, or a mirror mode.

20 Claims, 23 Drawing Sheets

(56) References Cited

U.S. PATENT DOCUMENTS

2008/0211977 A1 9/2008 Ijzerman et al.
2012/0075698 A1 3/2012 Minami

FOREIGN PATENT DOCUMENTS

| KR | 10-2011-0003225 | 1/2011 |
| KR | 10-2011-0045700 | 5/2011 |
| KR | 10-2011-0104701 | 9/2011 |
| KR | 10-2013-0064333 | 6/2013 |

(A)

(B)

(C)

DISPLAY DEVICE

CROSS-REFERENCE TO RELATED APPLICATION

This application claims priority under 35 U.S.C. §119 from Korean Patent Application No. 10-2014-0012624 filed in the Korean Intellectual Property Office on Feb. 4, 2014, and all the benefits accruing therefrom, the contents of which are herein incorporated by reference in their entirety.

BACKGROUND (a) Technical Field

Embodiments of the present disclosure are directed to a three-dimensional (3D) display device.

(b) Discussion of the Related Art

In general, a display device displays a two-dimensional (2D) planar image. However, as a demand for 3D stereoscopic images has increased in fields such as gaming and movies, 3D stereoscopic images can now be displayed using a display device.

A stereoscopic image display device divides an image into a left-eye image and a right-eye image that have binocular disparity, and respectively provides them to a left eye and a right eye of an observer. The observer recognizes the left-eye image and the right-eye image through both eyes, and the images are combined in the brain such that a stereoscopic image is perceived.

One way to make a stereoscopic display device display a stereoscopic image uses linearly polarized stereoscopic spectacles to divide the left-eye image from the right-eye image, however, spectacles must be worn.

To solve this requirement, a method has been proposed that does not involve wearing spectacles. Based on the type of lens element that divides the image, such a method includes a lenticular type, a parallax type, an integral photography type, and a holography type. In particular, a lenticular type of stereoscopic image display device has been studied.

A lens used in the lenticular device may be a convex lens or a Fresnel lens. A Fresnel lens is thinner than a convex lens. A Fresnel lens has a plurality of circular arcs on a surface thereof. The circular arcs of a Fresnel lens refract light.

A liquid crystal lens that can realize a Fresnel lens by controlling director distribution of liquid crystals through an electric field has been developed. A liquid crystal lens includes an upper substrate, a lower substrate, and a thick liquid crystal layer between the upper substrate and the lower substrate. The liquid crystal lens includes a plurality of electrodes, and each electrode may be supplied with a different voltage to control the liquid crystal directors.

SUMMARY

Embodiments of the present disclosure provide a display device adapted to displaying a 2D image, a 3D stereoscopic image, and a mirror operation by positioning a reflective polarizer between a liquid crystal lens panel and a display panel and appropriately controlling a voltage applied to the liquid crystal lens panel.

A display device according to an exemplary embodiment of the present disclosure includes: a liquid crystal lens panel positioned on a display panel; and a reflective polarizer positioned between the display panel and the liquid crystal lens panel, wherein the liquid crystal lens panel includes a lower substrate and an upper substrate facing each other, a lower lens electrode formed on the lower substrate, wherein the lower lens electrode includes a plurality of separate lower lens electrodes formed into lower lens electrode groups, wherein a width of each separate lower lens electrode becomes wider closer to a center of the lower lens electrode group, an upper lens electrode formed on the upper substrate, and a liquid crystal layer interposed between the lower substrate and the upper substrate. The liquid crystal lens panel can operate in a 2D mode a 3D mode, or a mirror mode.

The display device may further include an absorptive polarizer positioned on the upper substrate, wherein a transmissive axis of the reflective polarizer accords with a transmissive axis of the absorptive polarizer. The display panel may be selected from a group including an organic light-emitting display (OLED) panel, a liquid crystal display (LCD) panel, an electrophoretic display panel (EDP), and a plasma display panel (PDP).

When the liquid crystal lens panel is operated in 2D mode, the same image reaches both eyes of a viewer, and no voltage may be applied to the lower lens electrode and the upper lens electrode of the liquid crystal lens panel, or the same voltage may be applied to the lower lens electrode and the upper lens electrode.

The lower lens electrode may include two separate layers with an insulating layer interposed therebetween, and alternate adjacent lower lens electrodes may be disposed on a different layer.

When the liquid crystal lens panel is operated in 3D mode, different images may be transmitted to respective eyes of a viewer, a predetermined common voltage may be applied the upper lens electrode, and voltages different from the predetermined common voltage may be applied to the separate lower lens electrodes of the lower lens electrode groups.

Each lower lens electrode group may function as a Fresnel lens, wherein a plurality of Fresnel lenses may be formed on the display panel.

A vertical electric field may be formed between the upper lens electrode and the plurality of lower lens electrode groups.

The plurality of Fresnel lenses may retard a phase of light received from the display panel to generate binocular disparity, and a 3D stereoscopic image may be displayed by the display panel.

When the liquid crystal lens panel is operated in mirror mode, the liquid crystal lens panel may reflect incident light from the reflective polarizer, a common voltage of a predetermined magnitude may be applied to the upper lens electrode, and the common voltage may be applied to odd-numbered separate lower lens electrode and a voltage different from the common voltage may be applied to even-numbered separate lower lens electrodes, or the common voltage may be applied to the even-numbered separate lower lens electrodes and a voltage different from the common voltage may be applied to the odd-numbered separate lower lens electrodes.

A horizontal electric field may be formed between adjacent odd-numbered separate lower lens electrodes and even-numbered separate lower lens electrodes.

The liquid crystal lens panel may rotate the polarization of light passing therethrough by about 90 degrees.

Light that has passed through the liquid crystal lens panel and had its polarization rotated by 90 degrees may be reflected from the reflective polarizer back into the liquid crystal lens panel.

Light passing through the liquid crystal lens panel may be elliptically polarized.

The liquid crystal lens panel may elliptically polarize the transmitted light, wherein light of a determined wavelength band may be emitted, and the predetermined wavelength band of light passing through the liquid crystal lens panel may be reflected from the reflective polarizer.

A display device according to an exemplary embodiment of the present disclosure includes: a liquid crystal lens panel positioned on a display panel; and a reflective polarizer positioned between the display panel and the liquid crystal lens panel. The liquid crystal lens panel includes a lower substrate and an upper substrate facing each other, a lower lens electrode formed on the lower substrate, an upper lens electrode formed on the upper substrate, a liquid crystal layer interposed between the lower substrate and the upper substrate, and an absorptive polarizer positioned on the upper substrate. A transmissive axis of the reflective polarizer accords with a transmissive axis of the absorptive polarizer, and the liquid crystal lens panel is configured to be operated in a 2-dimensional (2D) mode, a 3-dimensional (3D) mode, or a mirror mode.

The lower lens electrode may include a plurality of separate lower lens electrodes formed into lower lens electrode groups, wherein a width of each separate lower lens electrode may become wider closer to a center of the lower lens electrode group, and the upper lens electrode may include separate upper lens electrodes that correspond to the separate lower lens electrodes.

The upper lens electrode may include two separate layers with an insulating layer interposed therebetween, alternate adjacent upper lens electrodes may be disposed on different layers, the lower lens electrode may include two separate layers with an insulating layer interposed therebetween, and alternate adjacent lower lens electrodes may be disposed on different layers.

When the liquid crystal lens panel is operated in mirror mode, the liquid crystal lens panel may reflect incident light from the reflective polarizer, a same voltage may be applied to odd-numbered separate lower lens electrodes and corresponding odd-numbered separate upper lens electrodes, a same voltage may be applied to even-numbered separate lower lens electrodes and corresponding even-numbered separate upper lens electrodes, and magnitudes of the voltages applied to the odd-numbered separate lens electrodes and the even-numbered separate lens electrodes may differ from each other.

When the liquid crystal lens panel is operated in 3D stereoscopic image mode, different images may be transmitted to respective eyes of a viewer, a predetermined common voltage may be applied to the separate upper lens electrodes, and the predetermined common voltage is applied to the odd-numbered separate lower lens electrodes and voltages different from the predetermined common voltage may be applied to even-numbered separate lower lens electrodes, or the predetermined common voltage may be applied to the even-numbered separate lower lens electrodes and voltages different from the predetermined common voltage are applied to the odd-numbered separate lower lens.

When the liquid crystal lens panel is operated in 2D mode, the same image may reach both eyes of a viewer, and either no voltage may applied to the lower lens electrode and the upper lens electrode of the liquid crystal lens panel, or the same voltage may be applied to the lower lens electrode and the upper lens electrode.

As described above, a display device according to an embodiment of the present disclosure positions the reflective polarizer between the liquid crystal lens panel and the display panel, and the voltage applied to the liquid crystal lens panel may be controlled such that the display panel may perform in a 2D image display mode, a 3D stereoscopic image display mode, or a mirror mode. Accordingly, without a change of the structure of the display device, a 2D image mode, a 3D stereoscopic image mode, and a mirror mode may all be realized according to a requirement of a user.

BRIEF DESCRIPTION OF THE DRAWINGS

FIG. 2 (B) is an enlarged view of a portion indicated by a dotted line in FIG. 2 (A); and FIG. 2 (C) is a view of a liquid crystal lens according to an exemplary embodiment of the present disclosure.

DETAILED DESCRIPTION OF EXEMPLARY EMBODIMENTS

Figure 1:
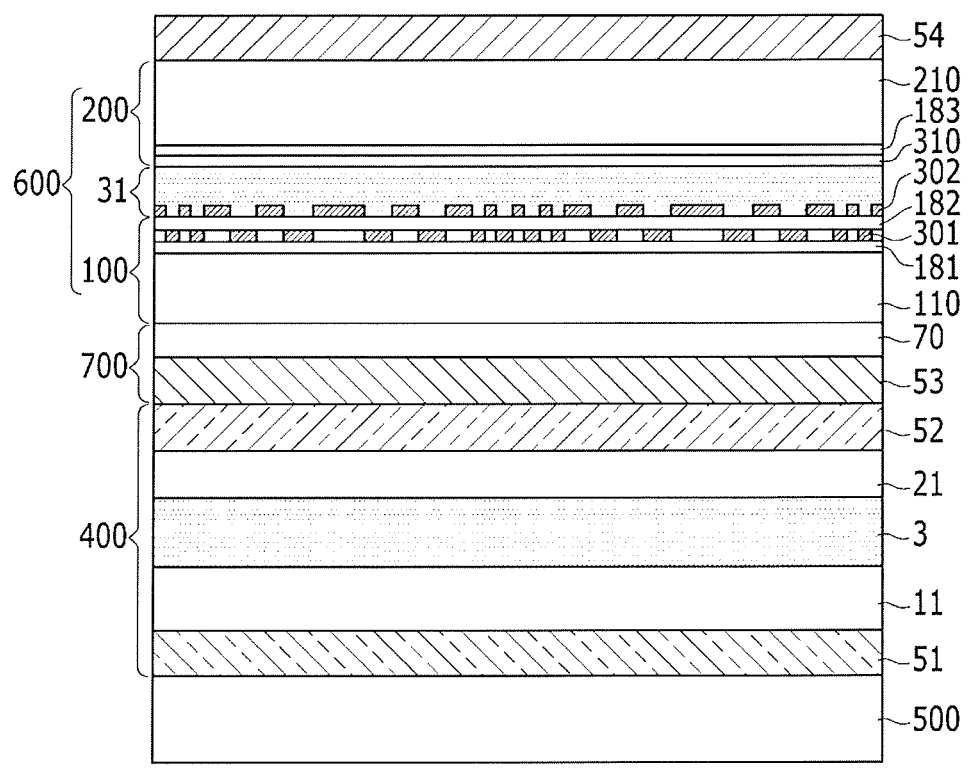
FIG. 1 is a view of a display device according to an exemplary embodiment of the present disclosure.

Embodiments of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Now, a display device according to an exemplary embodiment of the present disclosure will be described with reference to drawings.

FIG. 1 is a view of a display device according to an exemplary embodiment of the present disclosure. Referring to FIG. 1, a display device according to an exemplary embodiment of the present disclosure includes a display panel 400 and a liquid crystal lens panel 600 positioned on the display panel. A reflective panel 700 is positioned between the display panel 400 and the liquid crystal lens panel 600. A backlight unit 500 may be positioned under the display panel 400.

The display panel 400 may be one of various display panel types, such as an organic light emitting display (OLED) panel, a liquid crystal display (LCD) panel, an electrophoretic display panel (EDP), a plasma display panel (PDP), etc. In a present exemplary embodiment, as the display panel 400, a liquid crystal display (LCD) panel is described.

A display panel includes a first substrate 11 and a second substrate 21 facing each other, and a liquid crystal layer 3 positioned between the substrates. Liquid crystal molecules are aligned by a potential applied to electrodes formed in the first substrate and the second substrate, thereby displaying images.

The first substrate may include a plurality of pixel areas. In each pixel area, a gate line that extends in a first direction, a data line insulated from the gate line that extends in a second direction intersecting the first direction, and a pixel electrode are disposed. Also, in each pixel, a thin film transistor is provided that is electrically connected to the gate line and the data line and electrically connected to the corresponding pixel electrode. The thin film transistor provides a driving signal to a side of the corresponding pixel electrode. In addition, a driver IC may be disposed at one side of the first substrate. The driver IC receives various external signals, and outputs a driving signal that drives the display panel 30 to a side of the thin film transistor in response to various input control signals.

The second substrate may include RGB color filters on one surface that impart predetermined colors using light emitted from the backlight unit 500, and a common electrode disposed on the RGB color filters that faces the pixel electrode. Here, the RGB color filters may be formed through a thin film process. In addition, in a present disclosure, the color filters are formed on the second substrate, but embodiments of the present disclosure are not limited thereto. For example, the color filters may be formed on the first substrate. Further, the common electrode of the second substrate may be formed on the first substrate.

Molecules of the liquid crystal layer 3 are aligned by voltages applied to the pixel electrode and the common electrode to change the transmittance of the light provided from the backlight unit 500, thereby displaying an image through the display panel 400. In the case there is no backlight unit, the liquid crystal layer controls a transmittance of light incident to a front surface of the display panel and reflected, thereby displaying images.

A first polarizer 51 is positioned under the first substrate and a second polarizer 52 is positioned on the second substrate. The first polarizer 51 polarizes light emitted from the backlight unit 500. A transmissive axis of the first polarizer may be vertical or horizontal. The first polarizer is an absorptive polarizer that transmits light corresponding to the transmissive axis and absorbs light that is vertical to the transmissive axis.

The second polarizer polarizes the light emitted from the display panel.

The transmissive axis of the second polarizer may be vertical or horizontal. If the transmissive axis of the second polarizer is vertical, the second polarizer is an absorptive polarizer that absorbs light that oscillates horizontally. In contrast, if the transmissive axis of the second polarizer is horizontal, the second polarizer absorbs light that oscillates vertically.

In addition, the transmissive axis of the second polarizer may be the same as the direction of the transmissive axis of a reflective polarizer 53 of the reflection panel 700. Accordingly, the light passing through the second polarizer 52 also passes through the reflective polarizer 53.

The direction of the transmissive axis of the reflective polarizer 53 is parallel to the transmissive axis of the second polarizer 52, and the direction of the reflective axis of the reflective polarizer 53 is perpendicular to the transmissive axis. The reflective polarizer 53 transmits light that oscillates in a direction parallel to the transmissive axis and reflects light that oscillates in a direction perpendicular to the transmissive axis, that is, in a direction parallel to the reflective axis.

The reflective polarizer 53 may use a reflective polarization film, such as a dual brightness enhancement film (DBEF), a wire grid polarizer (WGP), or a $TiO_2$ multilayer film.

The reflective polarizer 53 may be formed by repeatedly depositing two films having different refractive indexes. In addition, a structure of the reflective polarizer 53 may include a minute linear metal pattern, and an interval between minute linear metal patterns may be less than a wavelength of visible light.

In addition, the reflective polarizer 53 may have a predetermined haze value. The reflective polarizer 53 that has a haze value may easily scatter incident or emitted light such to display brighter colors.

The backlight unit 500 is positioned under the first polarizer 51, and includes a light source that generates light and a light guide that receives light and guides the received light to a side of the display panel 400 and the liquid crystal lens panel 600.

According to an embodiment of the present disclosure, the light source may be formed of at least one light emitting diode (LED) and may be disposed at least one side of the light guide. That is, the light unit 500 may be an edge-type light unit in which the light source is located at a side surface of the light guide. Alternatively, according to an embodiment of the present disclosure, the light unit 500 may have a direct type of structure in which the light source is located directly below a diffuser, and the light source may include a fluorescent lamp instead of an LED.

According to an embodiment of the present specification, the display panel 400 is a liquid crystal panel, however embodiments are not limited thereto, and the display panel 400 may be an organic light emitting panel, in which case the polarizers 51 and 52 and the backlight unit 500 may be omitted.

The reflection panel 700 may include the reflective polarizer 53 and an adhesive layer 70 on the reflective polarizer 53. However, the adhesive layer 70 may be omitted. The direction of the transmissive axis of the reflective polarizer 53 is parallel to the transmissive axis of the second polarizer 52, and the direction of the reflective axis of the reflective polarizer 53 is perpendicular to the transmissive axis. The reflective polarizer 53 transmits light that oscillates in a direction parallel to the transmissive axis and reflects light that oscillates in a direction perpendicular to the transmissive axis, that is, in a direction parallel to the reflective axis.

The adhesive layer 70 of the reflective polarizer adheres the reflective polarizer 53 to the liquid crystal lens panel 600. The adhesive layer 70 may be made of a transparent material and may be omitted.

The liquid crystal lens panel 600 includes a lower substrate 100, an upper substrate 200, and a liquid crystal layer 31 including a plurality of liquid crystal molecules 32 interposed between the lower substrate and the upper substrate. A third polarizer 54 is positioned on the liquid crystal lens panel 600. The transmissive axis of the third polarizer is the same as the transmissive axis of the second polarizer.

Figure 2:
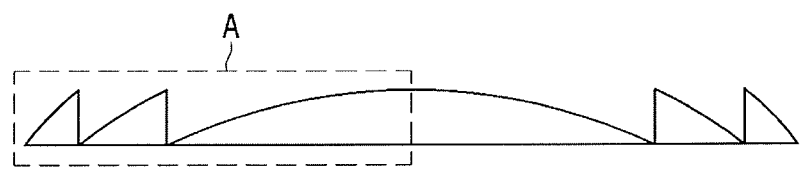
FIG. 2 (A) shows a general structure of a Fresnel lens.
Figure 2:
Figure 2:
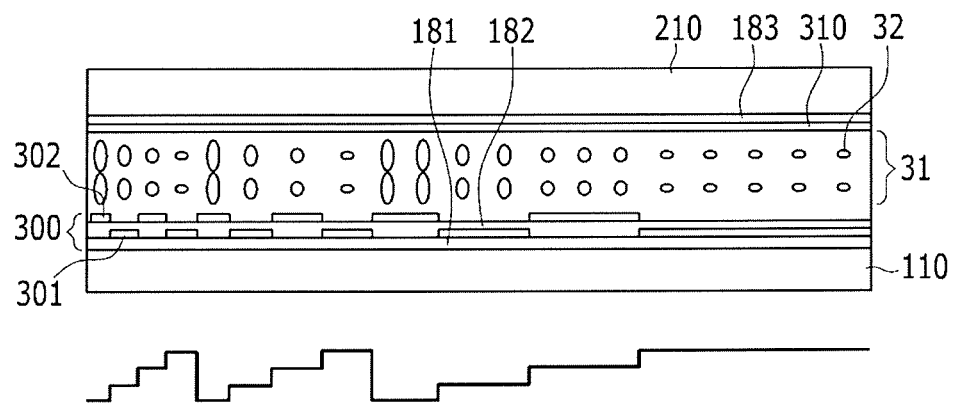

A structure of the liquid crystal lens panel 600 will be described with reference to FIG. 2 and FIG. 3.

FIG. 2(A) shows a general structure of a Fresnel lens, and FIG. 2(B) is an enlarged view of a portion indicated by a dotted line in FIG. 2(A). The step shapes shown in FIG. 2(B) indicate a zone plate phase distribution. FIG. 2(C) is a view of a liquid crystal lens according to an exemplary embodiment of the present disclosure.

In the present disclosure, a lens electrode is comprised of a lower lens electrode 300 made of a plurality of separate electrodes and an upper lens electrode 310 facing the lower electrode. The upper lens electrode may be a whole plate, and the upper lens electrode and the lower lens electrode are both transparent. Alternatively, the upper lens electrode may have an electrode structure that is similar to that of the lower electrode instead of being a whole plate FIG. 3 is a cross-sectional view and a layout view of the lower lens electrode 300 of a liquid crystal lens according to an exemplary embodiment of the present disclosure. A plurality of stripe shaped branch electrodes that include a first lens electrode and a second lens electrode are disposed in the lower lens electrode 300. The branch electrodes are disposed in a repetitive constant pattern in which one pattern of branch electrodes forms a unit lens electrode group. That is, FIG. 3 shows one unit lens electrode group.

Figure 3:
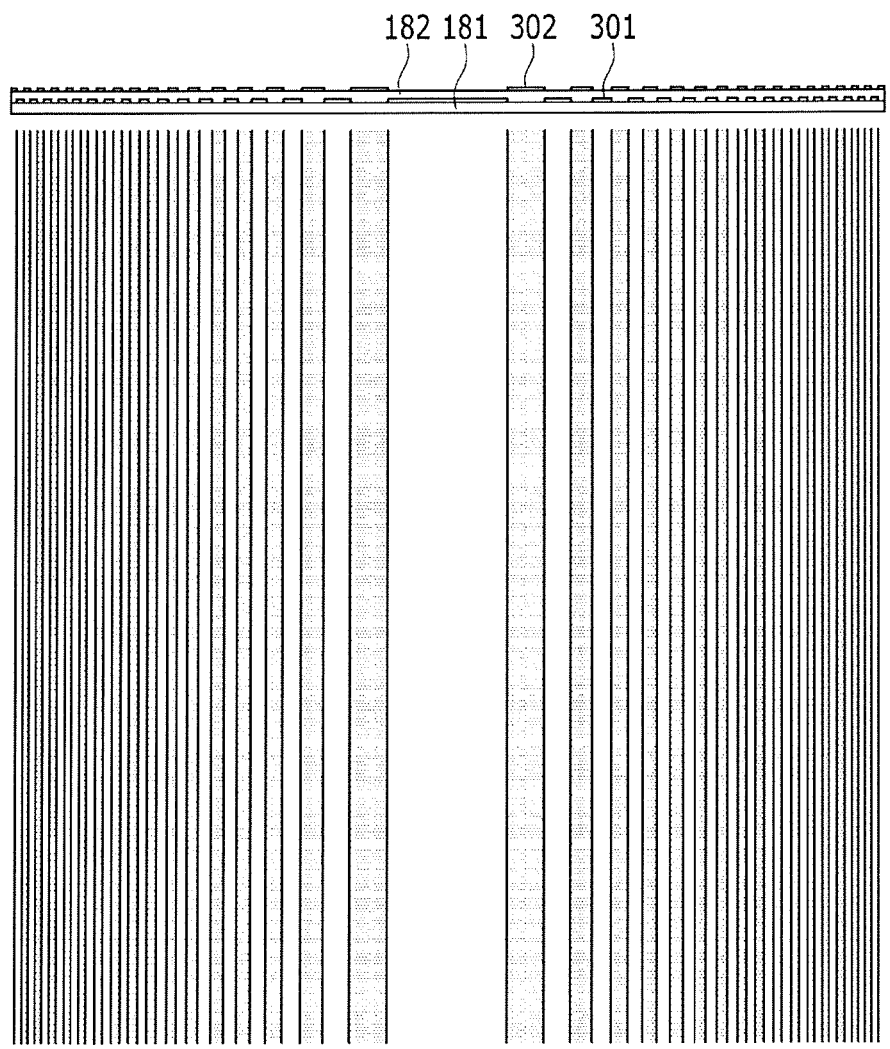
FIG. 3 a cross-sectional view and a layout view of a lower lens electrode of a liquid crystal lens according to an exemplary embodiment of the present disclosure.

Referring to FIG. 3, one unit lens electrode group has a shape in which a width of each separate lens electrode increases closer to the center thereof. This unit lens functions as a plate type liquid crystal lens. The zone plate is referred to as a Fresnel zone plate, and acts as a lens by using diffraction. A liquid crystal lens of the present disclosure can function as a Fresnel lens since a each separate electrode applies a different voltage to the liquid crystal molecules which then have different degrees of alignment.

As shown in FIG. 2(C), a liquid crystal lens of the present disclosure includes a lower substrate 110, an upper substrate 210 facing the lower substrate, and a liquid crystal layer 31 interposed between the lower substrate and the upper substrate that includes a plurality of liquid crystal molecules 32.

The first substrate includes the lower substrate 110, a first insulating layer 181 formed on the lower substrate, a plurality of first lens electrodes 301, a second insulating layer 182, and a plurality of second lens electrodes 302. The second insulating layer 182 is disposed between the first lens electrode 301 and the second lens electrode 302 such that the first electrodes and the second electrodes are formed at different layers and are electrically insulated from each other.

The first lens electrode 301 and the second lens electrode 302 may include a transparent conductive oxide. For example, the first lens electrode 301 and the second lens electrode 302 may include indium tin oxide (ITO) or indium zinc oxide (IZO).

The first insulating layer 181 and the second insulating layer 182 include an insulating material that transmits light. For example, the first insulating layer 181 and the second insulating layer 182 may include a silicon nitride (SiNx) or a silicon oxide (SiOx). The first insulating layer 181 is disposed on the lower substrate, the first lens electrodes 301 are disposed on the first insulating layer 181, the second insulating layer 182 is disposed on the first insulating layer 181 and the first lens electrodes 301, and the second lens electrodes 302 are disposed on the second insulating layer 182.

The upper lens electrode 310 is disposed on the upper substrate 210. The upper lens electrode 310 may include a transparent conductive oxide material. For example, the upper lens electrode 310 may include indium tin oxide (ITO) or indium zinc oxide (IZO).

A third passivation layer 183 may be positioned between the upper substrate 210 and the upper lens electrode 310.

The upper lens electrode 310, layer along with the first lens electrodes 301 and the second lens electrodes 302, rearrange the liquid crystal molecules of the liquid crystal. Accordingly, the first lens electrodes 301, the second lens electrodes 302, the upper lens electrode 310, and the liquid crystal layer 31 form a unit lens.

The liquid crystal layer 31 may have a thickness of about 2 μm to 5 μm. The liquid crystal layer 31 is thin to have a high switching speed according to the alignment of the liquid crystal molecules. The liquid crystal layer 31 may align to have a refractive index of a Fresnel lens due to the first lens electrodes 301, the second lens electrodes 302, and the upper lens electrode 310.

If a driving voltage is applied to the liquid crystal lens, a potential is generated between the first lens electrodes 301, the second lens electrodes 302, and the upper lens electrode 310, the liquid crystal molecules 32 of the liquid crystal layer 31 are rearranged. The path of the light passing through the liquid crystal lens panel changes based on the arrangement of the liquid crystal molecules. The liquid crystal lens panel 600 may vary the light received from the display panel 400 by changing the path of the light. According to this variation, a display device that includes the liquid crystal lens panel 600 may be operated in a 2D image mode, a 3D image mode, a mirror mode, or a color mirror mode.

Figure 5:
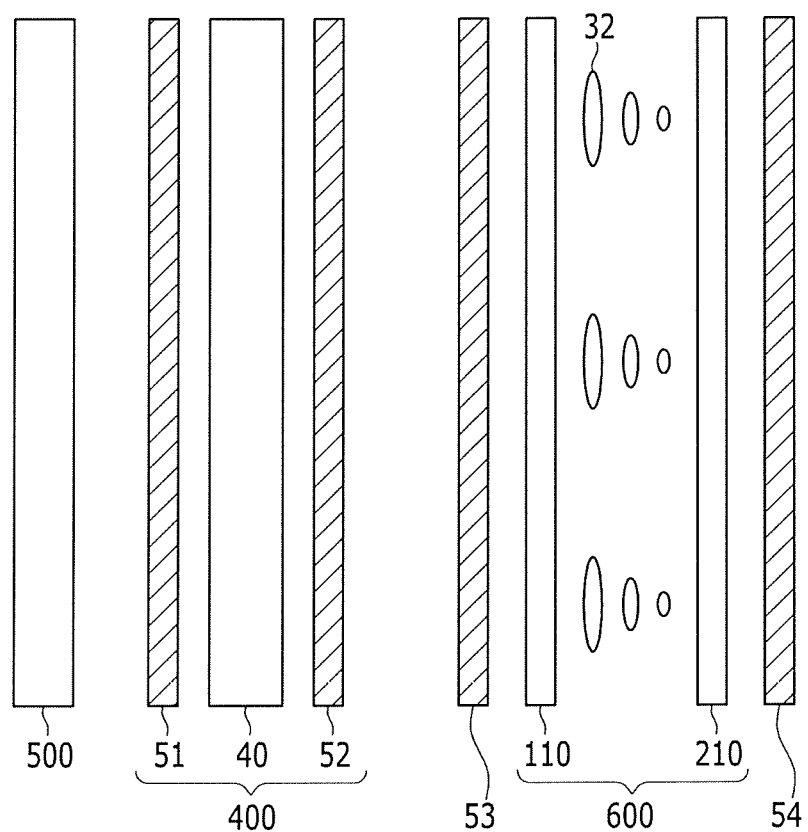
FIG. 5 is a schematic view of a display device of an embodiment of the present disclosure.

FIG. 5 is a schematic view of a display device of the present disclosure. Referring to FIG. 5, an operation of a 2D image mode, a 3D image mode, a mirror mode, and a color mirror mode will be described.

First, the operation of a 2D mirror mode will be described. In 2D mirror mode, no voltage is applied to the liquid crystal lens panel 600. Accordingly, the liquid crystal molecules 32 of the liquid crystal layer 31 of the liquid crystal lens panel 600 are unaligned and light emitted from the display panel 400 is not refracted when passing through the liquid crystal lens panel 600. Accordingly, an image displayed by the display panel 400 is recognized as a 2D image when there is no lens formed by liquid crystal lens panel 600. That is, when no voltage is applied to the liquid crystal lens panel 600, the display device operates in a 2D image mode.

In addition, when voltages of the same magnitude are applied to the lower lens electrode and the upper lens electrode of the liquid crystal lens panel 600, an electric field is formed in the liquid crystal layer in which the liquid crystal molecules of the liquid crystal layer are not aligned. Accordingly, in this case, the display device also operates in a 2D image mode.

Figure 4:
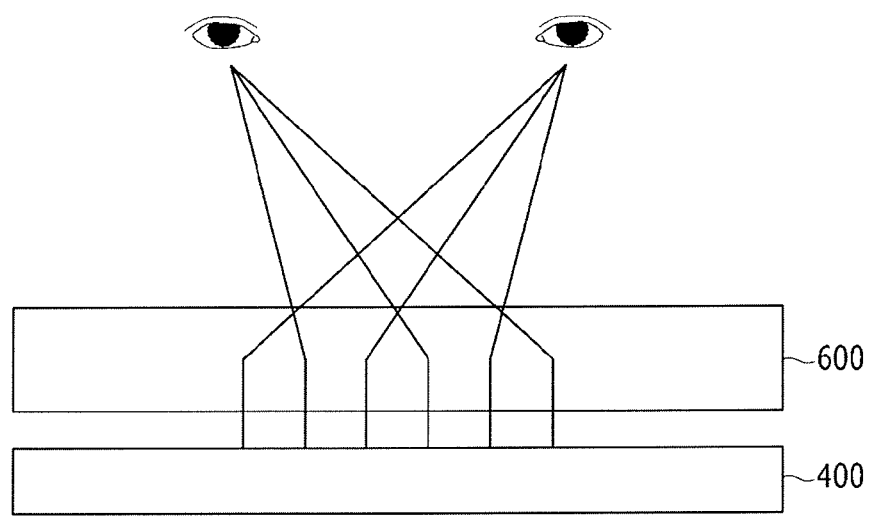
FIG. 4 is a schematic view of an operation of a 3D mirror mode.

Next, an operation of a 3D mirror mode will be described. FIG. 4 schematically shows the operation of a 3D mirror mode. Referring to FIG. 4, light passing through the display panel 400 is refracted while passing through the liquid crystal lens panel 600, thereby generating binocular disparity. Accordingly, an auto 3D stereoscopic image may be realized without separate 3D stereoscopic image spectacles.

Now, detailed operation will be described.

Referring to FIG. 2(C), voltages are applied to the upper lens electrode 310 and the lower lens electrodes 301 and 302 of the liquid crystal lens to arrange liquid crystal molecules 32 of the liquid crystal layer 31 in different directions. By the arrangement of the liquid crystal molecules 32, as shown in FIGS. 2(A)-(C), the liquid crystal lens panel operates as a Fresnel liquid crystal lens. Light passing through the Fresnel liquid crystal lens has a phase retardation due to differences of the refractive index due to the alignment of the liquid crystal molecules, thereby generating binocular disparity.

Figure 6:
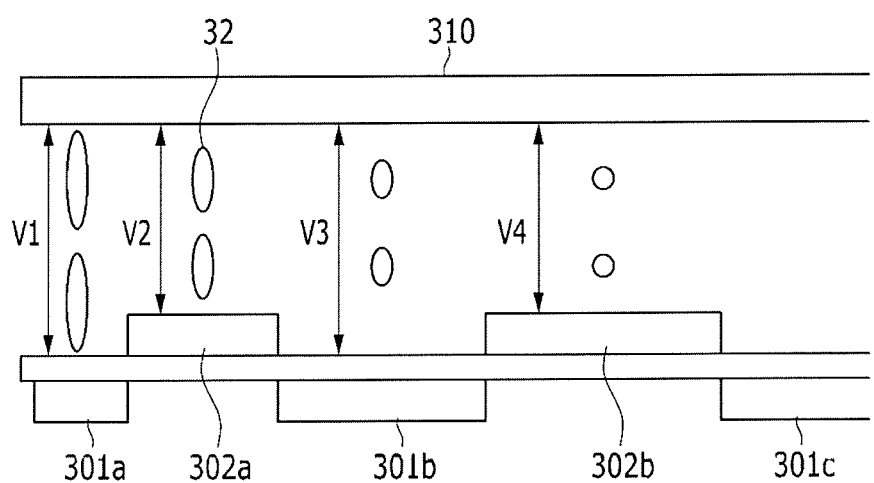
FIG. 6 is a view of a voltage being applied to each lens electrode when a display device is operated in a 3D stereoscopic image mode.

FIG. 6 shows the voltage application of each lens electrode on the operation of a 3D stereoscopic image mode. Referring to FIG. 6, a common voltage Vcom of a predetermined magnitude is applied to the upper lens electrode 310. Then, different voltages are applied to each separate lower lens electrode 300. The magnitudes of the applied voltages may have a step shape as shown in FIG. 2(C).

That is, referring to FIG. 6, the electric fields V1, V2, V3, and V4 formed between the lower lens electrodes 301a, 302a, 301b, 302b, and the upper lens electrode 310 are different for each region. The electric field V1 formed between a first lens electrode 301a and the upper lens electrode 310 may be larger than the electric field V4 formed between a second lens electrode 302b and the upper lens electrode 310. Accordingly, a strong vertical electric field is formed near the region where the electric field V1 is formed to vertically align the liquid crystal. However, a weak vertical electric field is formed near the region where the electric field V4 is formed that maintains the original horizontal state of the liquid crystal. FIG. 2(A) shows a Fresnel lens, and a plurality of Fresnel lenses may be formed on a display panel. Light received from the display panel 400 refracts while passing through a liquid crystal lens panel 600 that includes a plurality of Fresnel lenses to generate binocular disparity, so that a 3D stereoscopic image may be perceived without spectacles.

Figure 7:
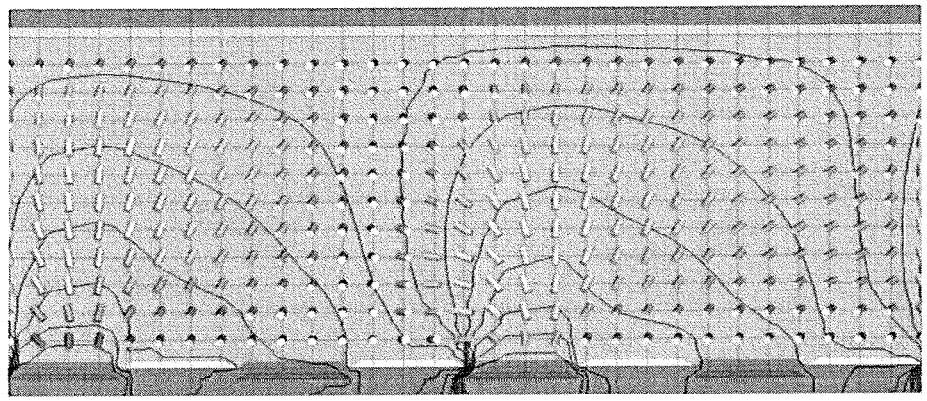
FIG. 7 is a view of an electric field and the alignments of liquid crystal molecules when a display device is operated in a 3D stereoscopic image mode.
Figure 8:
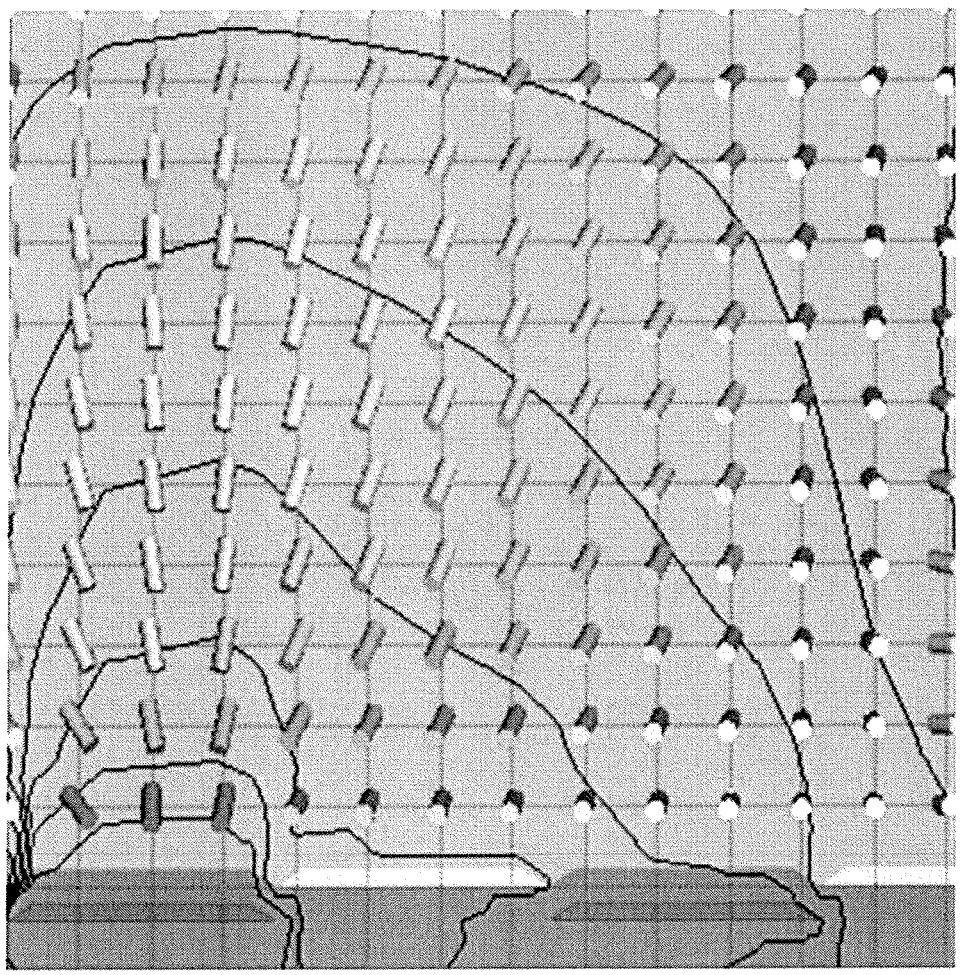
FIG. 8 is an enlarged view of a portion of FIG. 7.

FIG. 7 shows the electric field and the alignments of the liquid crystal molecules when a display is operated in a 3D stereoscopic image mode. Referring to FIG. 7, the directors of most liquid crystal molecules are vertical. A portion where the liquid crystal molecule directors are vertically aligned is the V1 region of FIG. 6 and a portion where the liquid crystal molecule directors are horizontally aligned is the V4 region of FIG. 6. FIG. 8 is an enlarged view of a portion of the vertical electric field in FIG. 7. Referring to FIG. 8, when the liquid crystal lens panel is operated in a 3D stereoscopic image mode, the directors of the liquid crystal molecules are vertically distributed.

Figure 9:
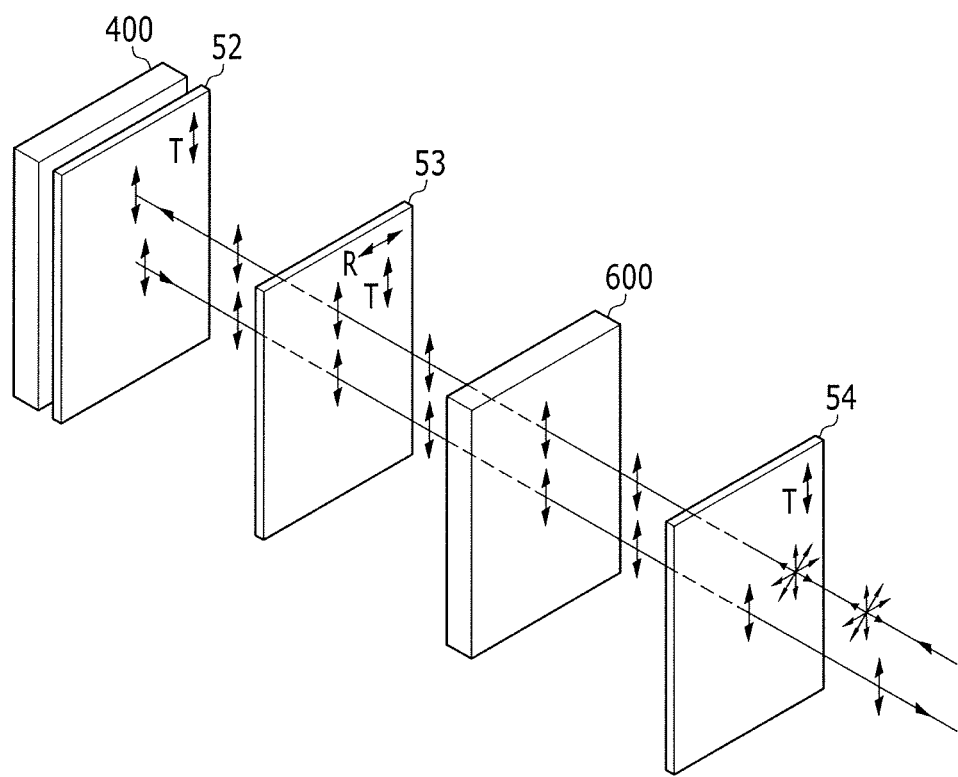
FIG. 9 is a view of a light path when a display device is operated in a 3D stereoscopic image mode.

FIG. 9 is a view of a light path when a display device is operated in a 3D stereoscopic image mode. The light incident into the display device through the third polarizer 54 is polarized in a predetermined direction, such as the vertical direction shown in FIG. 9. The transmissive axis of the reflective polarizer 53 is the same as the transmissive axis of the third polarizer 54 such that the incident light passes through the reflective polarizer. The transmissive axis of the reflective polarizer 53 is also is the same as the transmissive axis of the second polarizer 52. Accordingly, the light passing through the reflective polarizer 53 is incident into the display panel through the second polarizer 52.

The light emitted from the display panel 400 is polarized through the second polarizer 52. As described above, the transmissive axis of the second polarizer 52 and the reflective polarizer 53 are the same such that light passes through the reflective polarizer and is incident into the liquid crystal lens panel 600. The light passing through the liquid crystal lens panel 600 is phase retarded due to the director distribution of the liquid crystal molecules, which then propagates through the third polarizer. The phase retardation due to the liquid crystal lens panel 600 imparts binocular disparity to the image formed thereof, such that a 3D stereoscopic image may be perceived by a viewer without spectacles.

In FIG. 9, the second polarizer 52, the third polarizer 54, and the reflective polarizer 53 have transmissive axes in the vertical direction. However, the transmissive axes of the second polarizer 52, the third polarizer 54, and the reflective polarizer 53 may be horizontal. However, in this case, the transmissive axes of the second polarizer 52, the third polarizer 54, and the reflective polarizer 53 are all the same.

Figure 10:
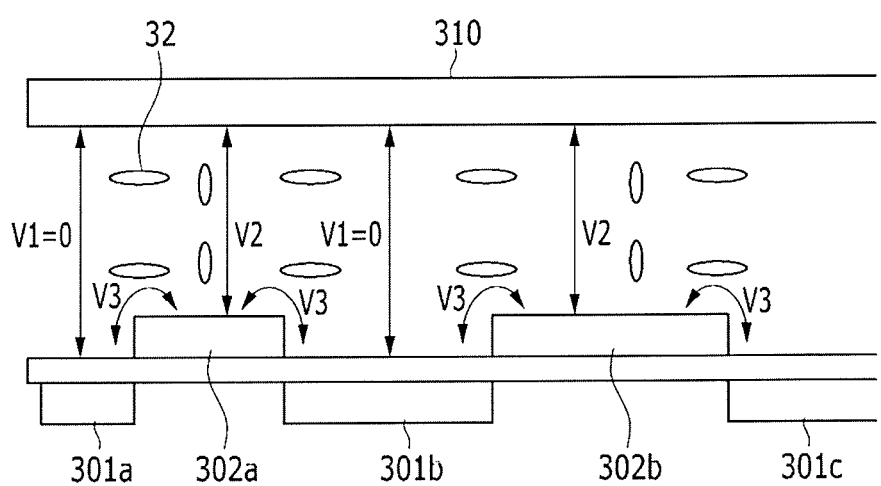
FIG. 10 is a view of a voltage being applied to a liquid crystal lens panel and a director distribution of a liquid crystal molecule when a display device is operated in mirror mode.
Figure 11:
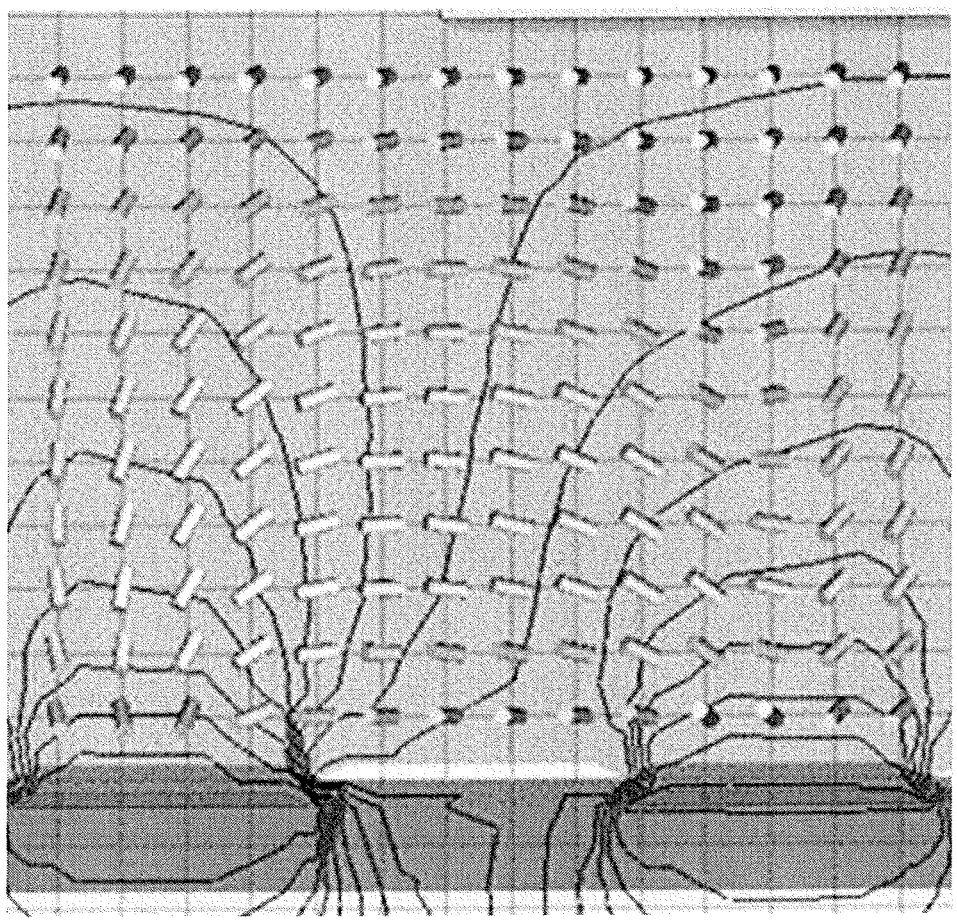
FIG. 11 is a view of an electric field and the alignments of the liquid crystal molecules when a display device is operated in mirror mode.
Figure 12:
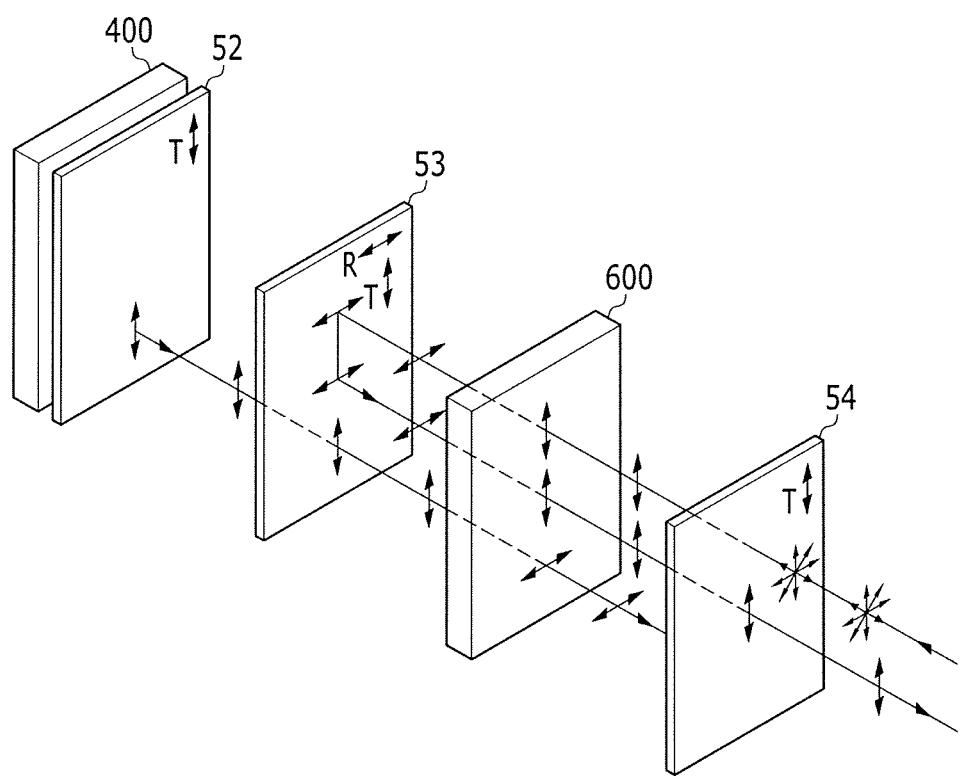
FIG. 12 is a view of a light path when a display device is operated in mirror mode.

Next, operation of a mirror mode will be described with reference to FIG. 10 to FIG. 12. FIG. 10 is a view of a voltage applied to a liquid crystal lens panel and a director distribution of a liquid crystal molecule when a display device is operated in mirror mode. FIG. 11 is a view of an electric field and the alignments of the liquid crystal molecules when a display device is operated in mirror mode. FIG. 12 is a view of a light path when a display device is operated in mirror mode.

Referring to FIG. 10, a voltage is applied to form a strong horizontal electric field in the liquid crystal lens panel when the display device is operated in mirror mode. Referring to FIG. 10, adjacent first lower lens electrodes 301a, 301b, and 301c positioned under the second insulating layer 182 receive the same voltage as the common voltage applied to the upper lens electrode 310. Accordingly, no electric field is created between the first lens electrode 301 and the upper lens electrode 310. That is, V1=0. In contrast, the second lens electrodes 302a, 302b, and 302c receive a voltage that is different from the common voltage. Accordingly, an electric field V2 is generated between the second lens electrodes 302 and the upper lens electrode 310 and an electric field V3 is also generated between the first lens electrodes 301 and the second lens electrodes 302. In this case, the electric field V2 between the upper lens electrode 310 and the second lens electrodes 302 is a vertical electric field, and the electric field V3 between the first lens electrodes 301 and the second lens electrodes 302 is a horizontal electric field. Accordingly, when a display device is operated in mirror mode, a horizontal electric field is created in the liquid crystal lens panel.

Figure 14:
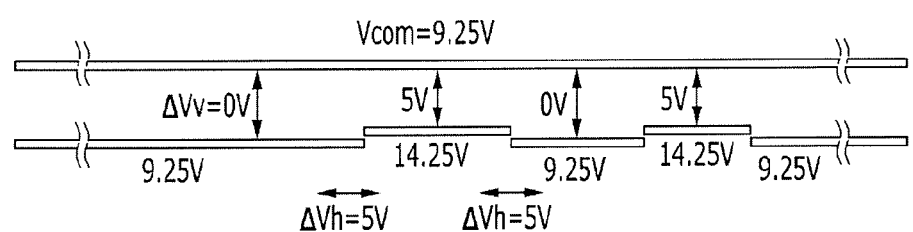
FIG. 14 is a view of an example of a voltage applied to a liquid crystal panel in mirror mode.

FIG. 14 is a view of an example of a voltage applied to a liquid crystal panel in mirror mode. Referring to FIG. 14, a common voltage Vcom of 9.25 V may be applied to the upper lens electrode. In the lower lens electrode, the separate odd-numbered lower lens electrodes receive a voltage of 9.25 V that is the same as the common voltage, and the separate even-numbered lower lens electrodes receive a voltage of 14.25 V that is different from the common voltage.

As shown in FIG. 14, no electric field is formed between the separate odd-numbered lower lens electrodes and the upper lens electrode. However, a vertical electric field of 5 V is formed between the separate even-numbered lower lens electrodes and the upper lens electrode. In addition, a horizontal electric field of 5 V is formed between alternate even-numbered lower lens electrodes and odd-numbered lower lens electrodes due to the voltage differences. As described above, when a liquid crystal lens panel is operated in mirror mode, a horizontal electric field is formed in the liquid crystal lens panel.

This horizontal electric field causes the average liquid crystal director distribution of the liquid crystal molecule 32 of the liquid crystal layer 31 to be aligned at about 45 degrees with respect to the transmissive axis of the reflective polarizer 53.

FIG. 11 is a view showing an electric field and the alignments of the liquid crystal molecules when the display device is operated in mirror mode. Referring to FIG. 11, the liquid crystal molecules are aligned in the horizontal direction. In this case, the horizontal director of the liquid crystal molecules is aligned at about 45 degrees with respect to the transmissive axis of the reflective polarizer 53.

Thus, when the director of the liquid crystal molecule is aligned at an angle of 45 degrees, a polarization vector of the light passing through the liquid crystal lens panel divides into a slow axis component Ps and a fast axis component Pf. If a phase difference of two components becomes π, the polarization direction of the light rotates by about 90 degrees. Accordingly, in a present exemplary embodiment, light passing through the liquid crystal lens panel 600 operated in mirror mode rotates by 90 degrees with respect to the polarization direction.

Next, a light path in a display device operated in mirror mode will be described with reference to FIG. 12.

Referring to FIG. 12, light incident from the outside is polarized in the vertical direction through the third polarizer 54. This light then passes through the liquid crystal lens panel 600 that is operated with a mirror mode voltage.

As described above, a mirror mode voltage distributes the director of the liquid crystal molecule of the liquid crystal lens panel 600 at the angle of about 45 degrees, and when light passes through the liquid crystal lens panel 600, components are decomposed such that the phase retardation difference becomes π. Accordingly, the polarization direction of light passing through the liquid crystal lens panel 600 rotates by 90 degrees, and in a present exemplary embodiment, the light becomes horizontally polarized. That is, incident light that is vertically polarized becomes horizontally polarized after passing through a liquid crystal lens panel operated in mirror mode.

As described above, the reflective polarizer transmits vertically polarized light and reflects horizontally polarized light. Accordingly, the horizontally polarized light that reaches the reflective polarizer is reflected. The reflected light again passes through the liquid crystal lens panel and becomes vertically polarized. The vertically polarized light is perceived by a viewer after passing through the transmissive axis of the third polarizer 54.

That is, externally received incident light is reflected back from the reflective polarizer such that the display device operates as a mirror.

When a display device is operated as a mirror, the lower display panel 400 does not display an image and is generally turned off. However, even if the display panel 400 is not turned off, the display device may be operated as a mirror.

Referring to FIG. 12, incident light received from the display panel is vertically polarized by the second polarizer and passes through the reflective polarizer, due to its vertical transmissive axis. When light passes through the liquid crystal lens panel 600 applied with a mirror mode voltage, the light becomes horizontally polarized. The horizontally polarized light does not pass through the the third polarizer 54 due to its vertical transmissive axis, and accordingly, the horizontally polarized light is not perceived by a viewer.

In the above description, each polarizer has a vertical transmissive axis, however the operating principle is the same when the polarizer has a horizontal transmissive axis. When the polarizer has a horizontal transmissive axis, it also has a vertical reflection axis.

Figure 13:
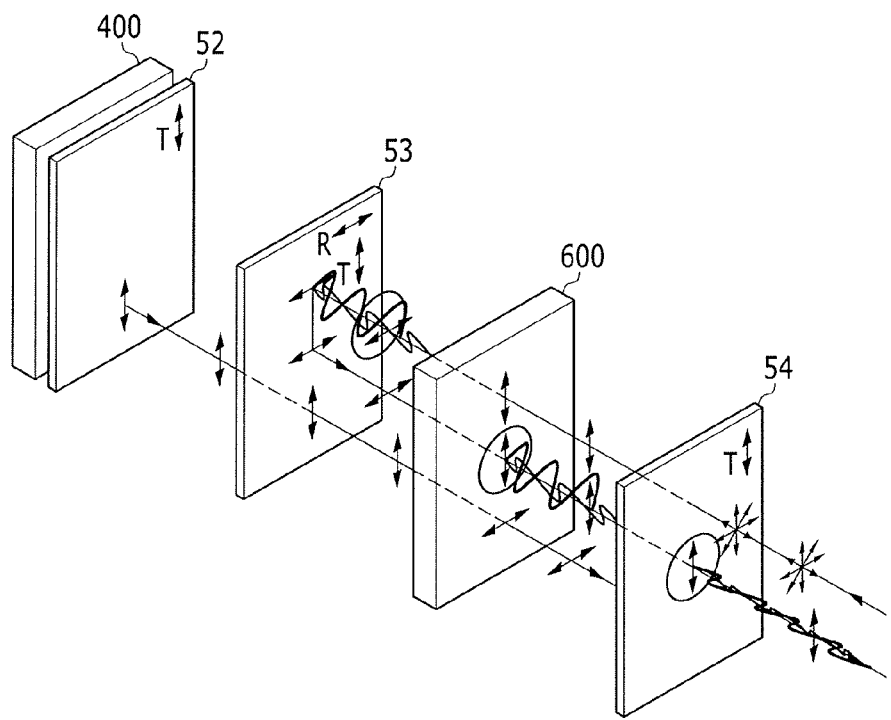
FIG. 13 is a view of a light path when a display device is operated in a color mirror mode.

Next, a color mirror mode will be described with reference to FIG. 13. FIG. 13 shows a light path when a display device is operated in a color mirror mode. Color mirror mode is similar to mirror mode. A detailed description of like constituent elements is omitted.

However, when a liquid crystal lens panel is operated in a color mirror mode, light passing through the liquid crystal lens panel becomes elliptically polarized. Elliptical polarization means that the polarization is different for each wavelength of light. Elliptically polarized light is partially reflected by the reflective polarizer 53 and again passes through the liquid crystal lens panel. The light passing through the liquid crystal lens panel again is elliptically polarized by being refracted by the alignments of the liquid crystal molecules 32. Accordingly, each wavelength of light has a different intensity, thereby expressing a predetermined color. That is, the liquid crystal lens panel 600 may emit light of different wavelength bands based on the difference of the voltages that are applied to the upper lens electrode and the lower lens electrode, which is equivalent to blocking the light of a different wavelength band. Accordingly, by changing the electric field applied to the liquid crystal molecules 32, the polarization may be controlled such that different colors may be realized.

The phase retardation of each wavelength can be expressed by a formula $\Delta\phi = \Delta n \times d \times 2\pi/\lambda$, wherein d represents the thickness of the liquid crystal layer of the phase retardation panel. In this case, the refractive index $\Delta n$ may be changed by varying the voltage applied to the liquid crystal layer to vary the phase retardation for each wavelength. That is, light in a predetermined wavelength band may have different phase retardations by varying the voltage differences applied to the liquid crystal layer, and the degree of the phase delay for each wavelength depends on the magnitude of the phase retardation. Thus, wavelengths having different phase retardations interfere with each other to represent a predetermined interference color, such that a fixed range of colors can be represented in a mirror mode.

Figure 15:
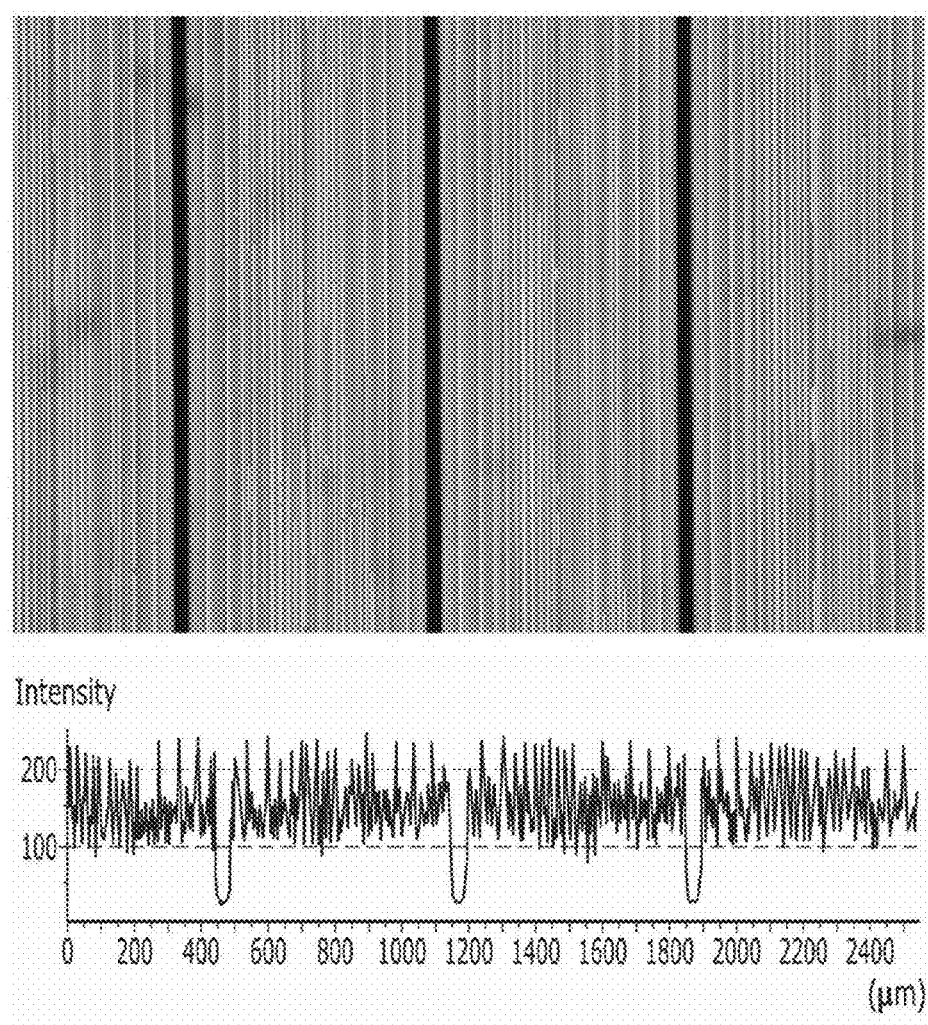
FIG. 15 is a view of light passing through a liquid crystal lens panel when a display device is operated in mirror mode.
Figure 16:
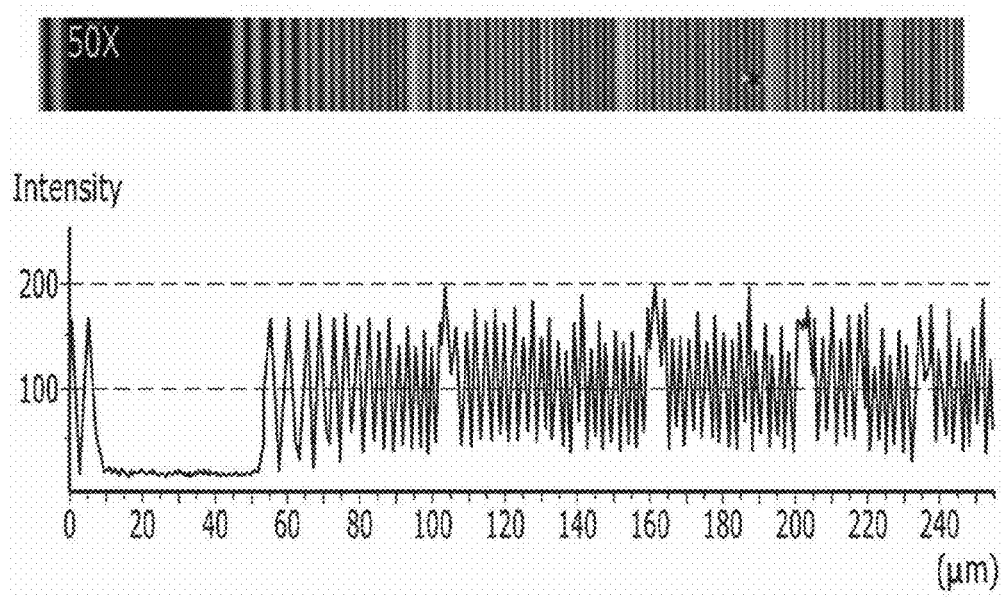
FIG. 16 shows a section of FIG. 15 enlarged 50-times.

Next, the operation of a display device in mirror mode according to an exemplary embodiment of the present disclosure will be described with reference to FIG. 14 to FIG. 17. FIG. 14 shows the voltage applied to each lens electrode when a display device is operated in mirror mode. FIG. 15 shows light passing through a liquid crystal lens panel when the display device is operated with the mirror mode. FIG. 16 shows a section of FIG. 15 enlarged 50-times, and FIG. 17 shows a section of FIG. 15 enlarged 100-times.

Referring to FIG. 14, the same common voltage Vcom as that applied to the upper lens electrode is applied to the odd-numbered electrodes of the lower lens electrode such that no electric field is formed therebetween. However, a different voltage from that applied to the upper lens electrode is applied to the even-numbered lower lens electrodes such that a horizontal electric field is formed between the odd-numbered lower lens electrodes and the even-numbered lower lens electrodes. The liquid crystal molecules are aligned in the horizontal direction by the horizontal electric field formed between the separate lower lens electrodes, and light is transmitted between the lower lens electrodes. This may be confirmed by FIG. 15 to FIG. 17.

Referring to FIG. 15, it may be seen that light is not transmitted to the relatively wide center lens electrode, which appears black, and that light is transmitted between the lower separate lens electrodes.

Figure 17:
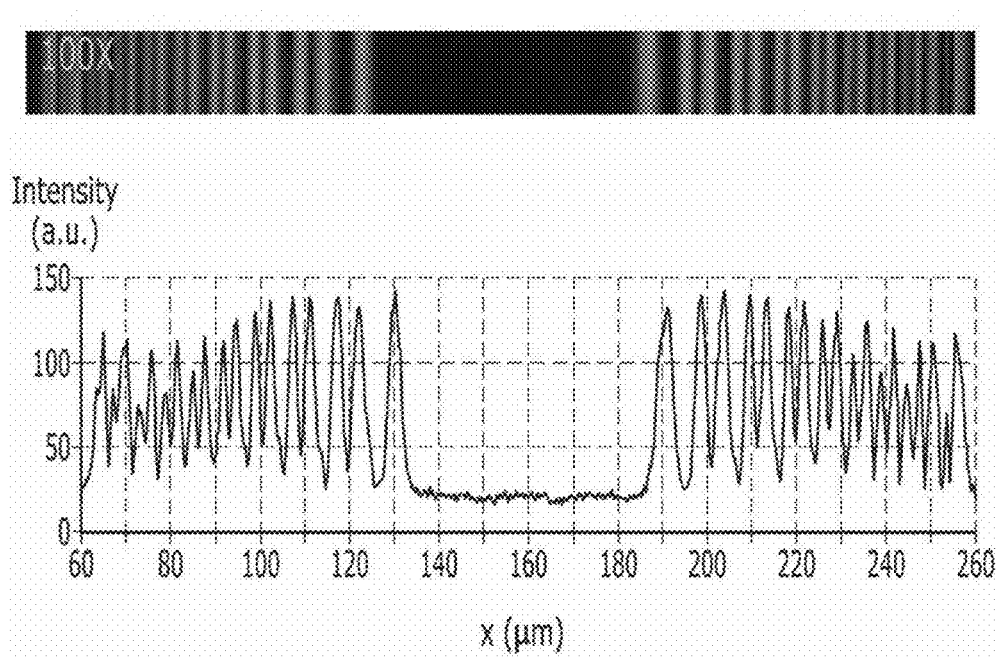
FIG. 17 shows a section of FIG. 15 enlarged 100-times.

In this case, the intensity of the transmitted light is greatest at the boundary of each separate lower lens electrode, as may be seen in the lower graph of FIG. 17.

As described above, a display device of the present disclosure includes a liquid crystal lens panel positioned on a display panel, and by controlling a voltage applied to the liquid crystal lens panel, the display device may be operated in a 2D image mode, a 3D stereoscopic image display mode, mirror mode, and color mirror mode.

Next, a display device according to another exemplary embodiment of the present disclosure will be described with reference to FIG. 18 to FIG. 23. Referring to FIG. 18 to FIG. 23, the display panel according to each exemplary embodiment is the same as the above-described display panel. A detailed description for like constituent elements is omitted.

Figure 18:
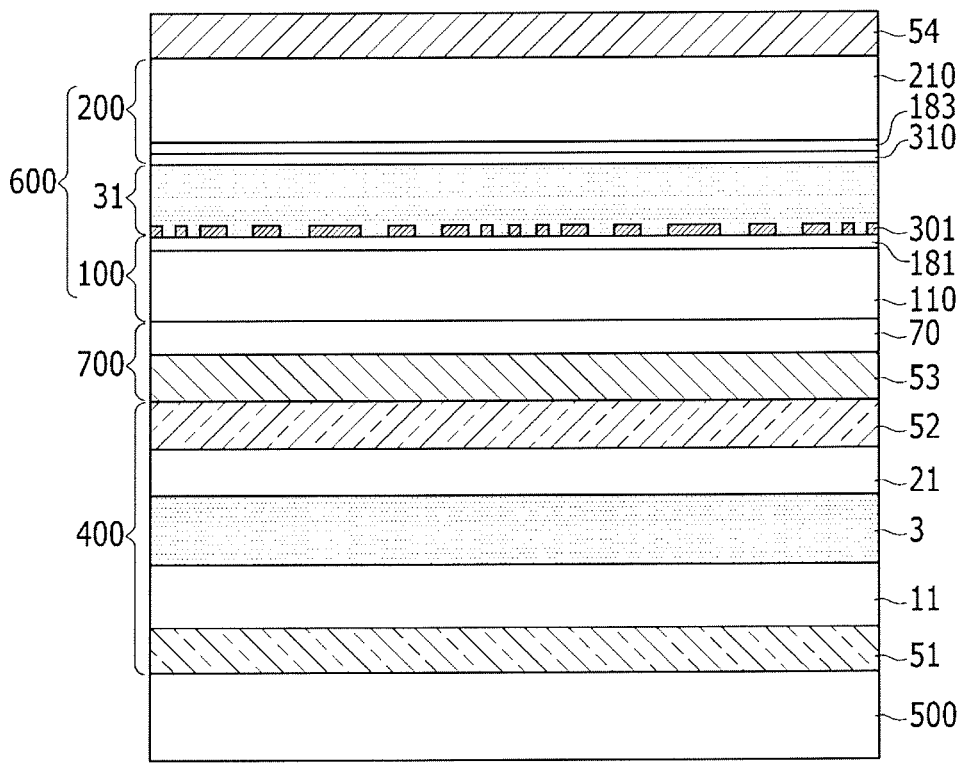
FIG. 18 is a cross-sectional view of a display device according to another exemplary embodiment of the present disclosure.
Figure 19:
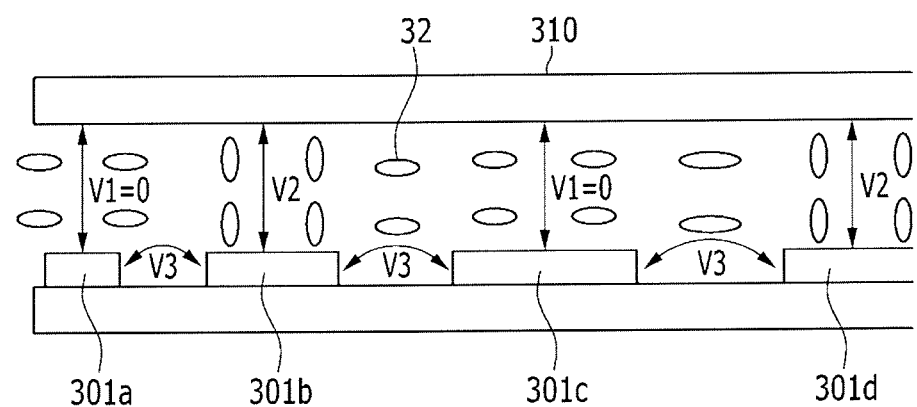
FIG. 19 is a view of a voltage being applied to a liquid crystal lens panel according to the exemplary embodiment of FIG. 18.

FIG. 18 is a cross-sectional view of a display device according to another exemplary embodiment of the present disclosure, and FIG. 19 is a view of a voltage being applied to a liquid crystal lens panel according to the exemplary embodiment of FIG. 18. Referring to FIG. 18, in a display device according to a present exemplary embodiment, the lower lens electrode of the liquid crystal lens panel has a single layer. Accordingly, as shown in FIG. 19, different voltages are alternately applied between the adjacent lower lens electrodes of the single layer. That is, the odd-numbered lower lens electrodes are applied with the same voltage as the upper lens electrode, and the even-numbered lower lens electrodes are applied with a different voltage from the upper lens electrode. Thus, there is no electric field V1 formed between the odd-numbered lower lens electrodes 301a, 301c and the upper lens electrode 310, a vertical electric field V2 is formed between the even-numbered lower lens electrodes 301b, 301d and the upper lens electrode 310, and a horizontal electric field V3 is formed between adjacent odd-numbered lower lens electrodes and even-numbered lower lens electrodes. The description of the horizontal electric field formed in the liquid crystal layer and the director distribution of the liquid crystal is the same as described above.

Figure 20:
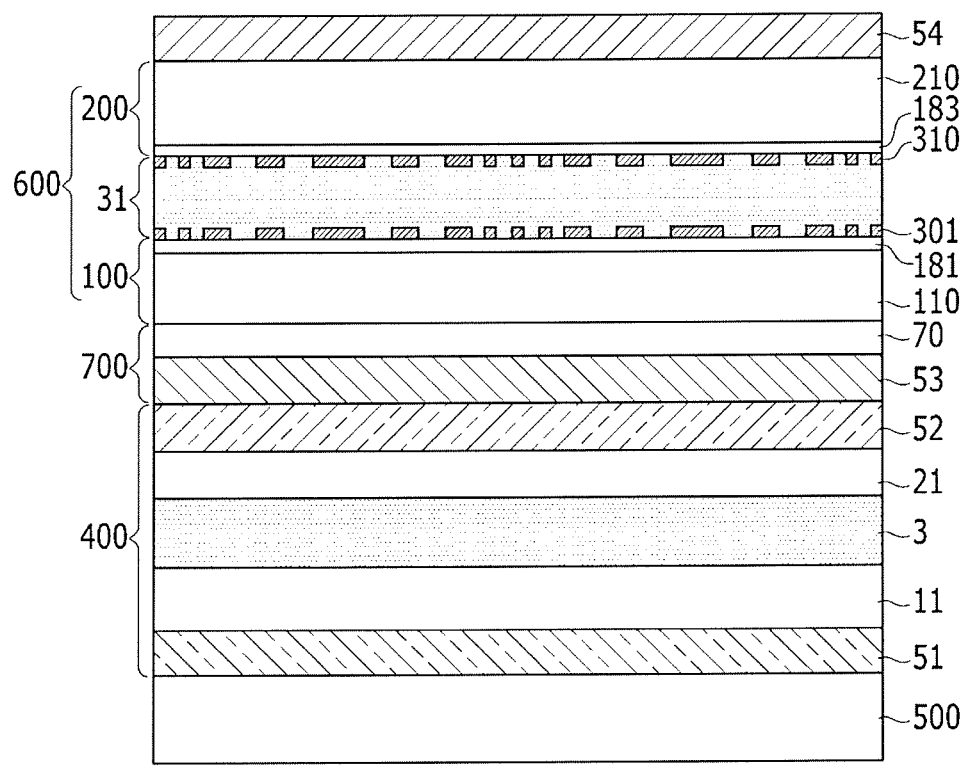
FIG. 20 is a cross-sectional of a display device according to another exemplary embodiment of the present disclosure.
Figure 21:
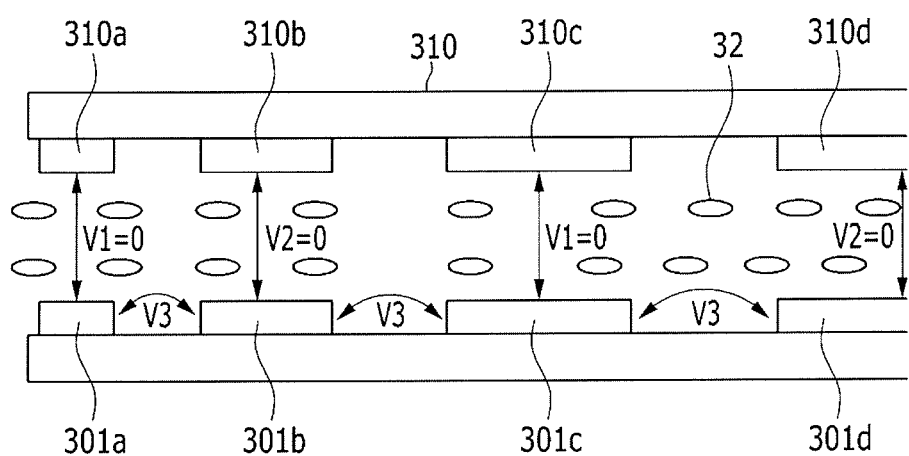
FIG. 21 is a view of a voltage being applied to a liquid crystal lens panel according to the exemplary embodiment of FIG. 20.

FIG. 20 is a cross-sectional of a display device according to another exemplary embodiment of the present disclosure, and FIG. 21 is a view of a voltage being applied to a liquid crystal lens panel according to the exemplary embodiment of FIG. 20. Referring to FIG. 20, in a display device according to a present exemplary embodiment, both the lower lens electrode and the upper lens electrode of the liquid crystal lens panel are made of a single layer of separate electrodes. That is, while the upper lens electrode of a liquid crystal lens panel according to a previous exemplary embodiment is a whole plate, however the upper lens electrode of a liquid crystal lens panel according to a present exemplary embodiment is made of separate electrodes whose size corresponds to the separate lower lens electrodes.

Accordingly, when operating in mirror mode, the upper lens electrodes and the lower lens electrodes that face each other are each applied with voltages of the same magnitude. In this case, the even-numbered lens electrodes and the odd-numbered lens electrodes are applied with different voltages.

For example, an odd-numbered upper lens electrode 310a and an odd-numbered lower lens electrode 301a opposite each other may be applied with a voltage of 9.25 V, and an even-numbered upper lens electrode 310b and an even-numbered lower lens electrode 301b opposite each other may be applied with a voltage of 12.5 V.

Since the voltages of the lower lens electrode and the upper lens electrode are the same such, no vertical electric field is generated therebetween. That is, the vertical electric fields V1 and V2 are 0 V. The only electric field formed in the liquid crystal layer of the liquid crystal lens panel is a horizontal electric field between adjacent lens electrodes. Accordingly, the director distribution of the liquid crystal molecules is substantially horizontal such that a display device that includes a liquid crystal panel according to a present exemplary embodiment may operate in mirror mode.

When a liquid crystal panel according to a present exemplary embodiment is operated in 3D stereoscopic image mode, all separate upper lens electrodes are applied with the same common voltage to obtain a same effect as that of using an upper lens electrode that is a whole plate.

Figure 22:
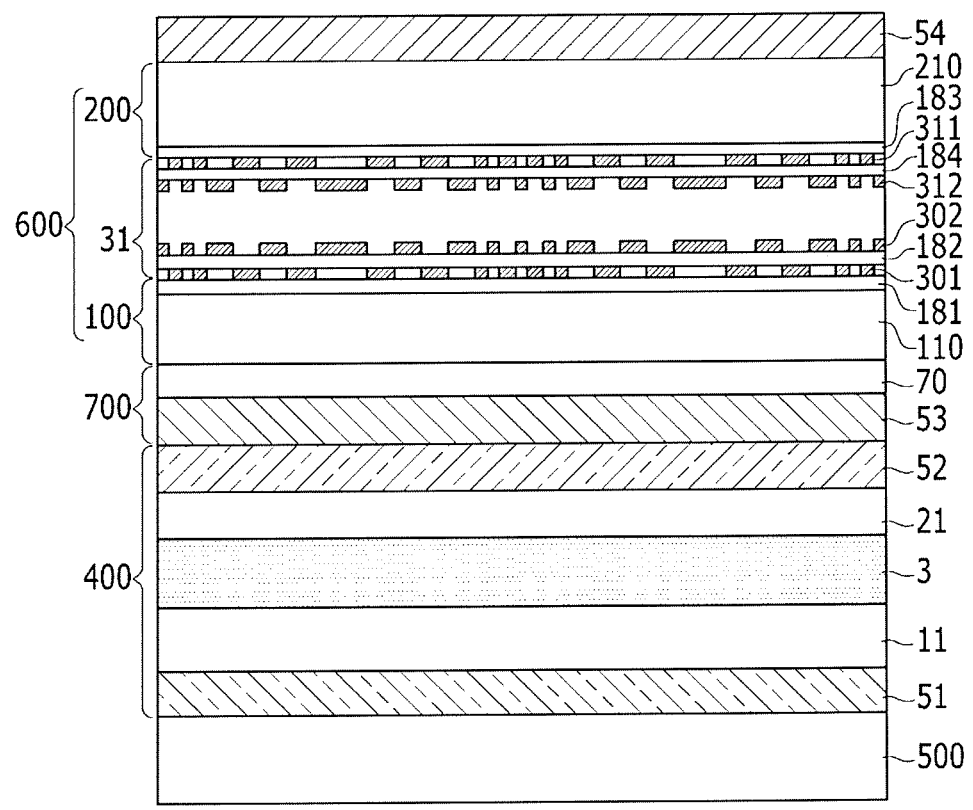
FIG. 22 is a cross-sectional of a display device according to another exemplary embodiment of the present disclosure.
Figure 23:
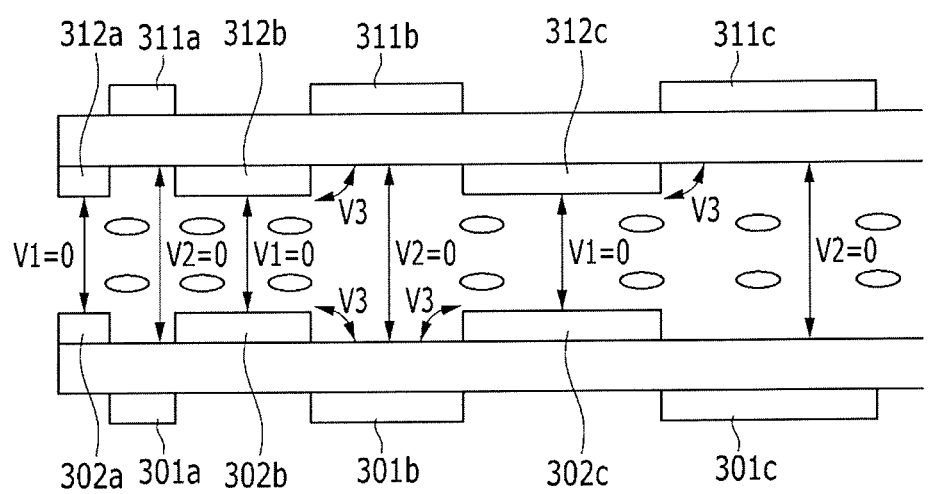
FIG. 23 is a view of a voltage being applied to a liquid crystal lens panel according to the exemplary embodiment of FIG. 22.

FIG. 22 is a cross-sectional of a display device according to another exemplary embodiment of the present disclosure, and FIG. 23 is a view of a voltage being applied to a liquid crystal lens panel according to the exemplary embodiment of FIG. 22. Referring to FIG. 22 and FIG. 23, a display device according to a present exemplary embodiment is similar to the display device according to the exemplary embodiment shown in FIGS. 20 and 21. A detailed description of like constituent elements is omitted.

However, in a display device according to a present exemplary embodiment, in addition to the upper lens electrode and the lower lens electrode being made of separate electrodes, the upper lens electrode and the lower lens electrode are also include dual layers. Likewise, in operating in mirror mode, the upper lens electrodes and the lower lens electrodes corresponding to each other are applied with the same voltage such that no vertical electric field is generated. In contrast, different voltages are applied between the adjacent lower lens electrodes such that only a horizontal electric field is generated.

In a present exemplary embodiment, the upper lens electrode and the lower lens electrode are made of dual layers such that the electrodes forming the electric field are arranged close to each other. Accordingly, a strong horizontal electric field may be formed within the liquid crystal layer and a liquid crystal lens panel may have improved performance.

Likewise, when a liquid crystal panel according to a present exemplary embodiment is operated in 3D stereoscopic image mode, all separate upper lens electrodes are applied with the same common voltage to obtain a same effect as when using a whole plate upper lens electrode.

While embodiments of this disclosure have been described in connection with what is presently considered to be practical exemplary embodiments, it is to be understood that embodiments of the disclosure are not limited to the disclosed embodiments, but, on the contrary, are intended to cover various modifications and equivalent arrangements included within the spirit and scope of the appended claims.

What is claimed is:
1. A display device comprising:
a liquid crystal lens panel positioned on a display panel; and
a reflective polarizer positioned between the display panel and the liquid crystal lens panel,
wherein the liquid crystal lens panel includes a lower substrate and an upper substrate facing each other, a lower lens electrode formed on the lower substrate, wherein the lower lens electrode includes a plurality of separate lower lens electrodes formed into lower lens electrode groups;

an upper lens electrode formed on the upper substrate, and a liquid crystal layer interposed between the lower substrate and the upper substrate, wherein the liquid crystal lens panel is configured to be operated in a 2-dimensional (2D) mode, a 3-dimensional (3D) mode, or a mirror mode.

2. The display device of claim 1, further comprising:

an absorptive polarizer positioned on the upper substrate, wherein a transmissive axis of the reflective polarizer is parallel with a transmissive axis of the absorptive polarizer, and the display panel is selected from a group comprising an organic light-emitting display (OLED) panel, a liquid crystal display (LCD) panel, an electrophoretic display panel (EDP), and a plasma display panel (PDP).

3. The display device of claim 1, wherein when the liquid crystal lens panel is operated in 2D mode, the same image reaches both eyes of a viewer, and no voltage is applied to the lower lens electrode and the upper lens electrode of the liquid crystal lens panel, or the same voltage is applied to the lower lens electrode and the upper lens electrode.

4. The display device of claim 1, wherein the lower lens electrode includes two separate layers with an insulating layer disposed therebetween, and alternate adjacent lower lens electrodes are disposed on a different layer.

5. The display device of claim 1, wherein when the liquid crystal lens panel is operated in 3D mode, different images are transmitted to respective eyes of a viewer, a predetermined common voltage is applied to the upper lens electrode, and voltages different from the predetermined common voltage are applied to the separate lower lens electrodes of the lower lens electrode groups.

6. The display device of claim 5, wherein a width of each separate lower lens electrode becomes wider closer to a center of the lower lens electrode group, and each lower lens electrode group functions as a Fresnel lens, wherein a plurality of Fresnel lenses are formed on the display panel.

7. The display device of claim 5, wherein a vertical electric field is formed between the upper lens electrode and the plurality of lower lens electrode groups.

8. The display device of claim 6, wherein the plurality of Fresnel lenses retard a phase of light received from the display panel to generate binocular disparity, and a 3D stereoscopic image is displayed on the display panel.

9. The display device of claim 1, wherein when the liquid crystal lens panel is operated in mirror mode, the liquid crystal lens panel reflects incident light from the reflective polarizer, a common voltage of a predetermined magnitude is applied to the upper lens electrode, and the common voltage is applied to odd-numbered separate lower lens electrodes and a voltage different from the common voltage is applied to even-numbered separate lower lens electrodes, or the common voltage is applied to the even-numbered separate lower lens electrodes and a voltage different from the common voltage is applied to the odd-numbered separate lower lens electrodes.

10. The display device of claim 9, wherein a horizontal electric field is formed between adjacent odd-numbered separate lower lens electrodes and even-numbered separate lower lens electrodes.

11. The display device of claim 10, wherein the liquid crystal lens panel rotates the polarization of light passing therethrough by 90 degrees.

12. The display device of claim 11, wherein, light that has passed through the liquid crystal lens panel and had its polarization rotated by 90 degrees is reflected from the reflective polarizer back into the liquid crystal lens panel.

13. The display device of claim 10, wherein light passing through the liquid crystal lens panel is elliptically polarized.

14. The display device of claim 13, wherein the liquid crystal lens panel elliptically polarizes the transmitted light, wherein light of a determined wavelength band is emitted, and the predetermined wavelength band of light passing through the liquid crystal lens panel is reflected from the reflective polarizer.

15. A display device comprising:

a liquid crystal lens panel positioned on a display panel; and a reflective polarizer positioned between the display panel and the liquid crystal lens panel, wherein the liquid crystal lens panel includes a lower substrate and an upper substrate facing each other, a lower lens electrode formed on the lower substrate, an upper lens electrode formed on the upper substrate, a liquid crystal layer interposed between the lower substrate and the upper substrate, and an absorptive polarizer positioned on the upper substrate, wherein a transmissive axis of the reflective polarizer is parallel with a transmissive axis of the absorptive polarizer, and wherein the liquid crystal lens panel is configured to be operated in a 2-dimensional (2D) mode, a 3-dimensional (3D) mode, or a mirror mode.

16. The display device of claim 15, wherein the lower lens electrode includes a plurality of separate lower lens electrodes formed into lower lens electrode groups, wherein a width of each separate lower lens electrode becomes wider closer to a center of the lower lens electrode group, and the upper lens electrode includes separate upper lens electrodes that correspond to the separate lower lens electrodes.

17. The display device of claim 16, wherein the upper lens electrode includes two separate layers with an insulation layer interposed therebetween, alternate adjacent upper lens electrodes are disposed on different layers, the lower lens electrode includes two separate layers with an insulating layer interposed therebetween, and alternate adjacent lower lens electrodes are disposed on different layers.

18. The display device of claim 16, wherein when the liquid crystal lens panel is operated in mirror mode, the liquid crystal lens panel reflects incident light from the reflective polarizer, a same voltage is applied to odd-numbered separate lower lens electrodes and corresponding odd-numbered separate upper lens electrodes, a same voltage is applied to even-numbered separate lower lens electrodes and corresponding even-numbered separate upper lens electrodes, and magnitudes of the voltages applied to the odd-numbered separate lens electrodes and the even-numbered separate lens electrodes differ from each other.

19. The display device of claim 16, wherein when the liquid crystal lens panel is operated in 3D stereoscopic image mode, different images are transmitted to respective eyes of a viewer, a predetermined common voltage is applied to the upper lens electrode, and the predetermined common voltage is applied to odd-numbered separate lower lens electrodes, and voltages different from the predetermined common voltage are applied to even-numbered separate lower lens electrodes, or the predetermined common voltage is applied to the even-numbered separate lower lens electrodes, and voltages different from the predetermined common voltage are applied to the odd-numbered separate lower lens electrodes.

20. The display device of claim 15, wherein when the liquid crystal lens panel is operated in 2D mode, the same image reaches both eyes of a viewer, and no voltage is applied to the lower lens electrode and the upper lens electrode of the liquid crystal lens panel, or the same voltage is applied to the lower lens electrode and the upper lens electrode.

* * * * *